UNITED STATES PATENT OFFICE.

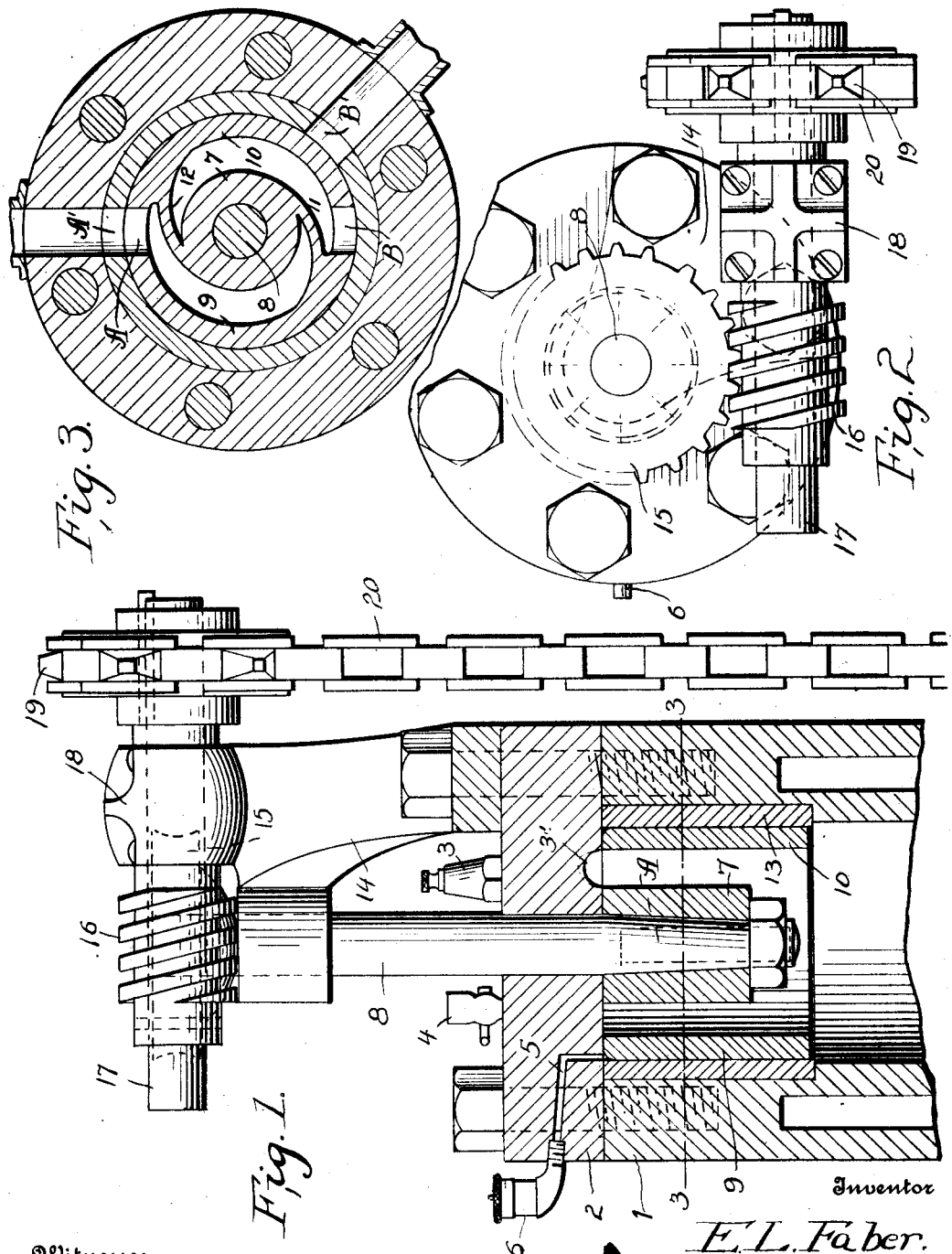

ERNEST L. FABER, OF RICHMOND, VIRGINIA.

ROTARY VALVE FOR GAS-ENGINES.

1,128,965.

Specification of Letters Patent. Patented Feb. 16, 1915.

Application filed May 21, 1913. Serial No. 769,085.

*To all whom it may concern:*

Be it known that I, ERNEST L. FABER, a citizen of the United States, residing at Richmond, in the county of Henrico and State of Virginia, have invented certain new and useful Improvements in Rotary Valves for Gas-Engines; and I do hereby declare the following to be a full, clear, and exact description of the invention, such as will enable others skilled in the art to which it appertains to make and use the same.

This invention relates to new and useful improvements in rotary valves for four-cycle engines, and as its principal object aims to provide a valve controlling the supply of the combustible gas to the cylinder, and the exhaust of the products combusted therefrom.

A further object is to construct a valve of the type above set forth which is simple and compact in construction, will afford comparatively large ports and passage areas for the ready and rapid supply and exhaust of the gases, and will operate without involving any appreciable waste of the combustible fluid.

A further object of this invention is to provide improved connections between the valve and the gearing, by which it is operatively connected to the engine shaft.

A still further object is to provide a rotary valve for gas engines which may be cheaply manufactured, will be durable and efficient in its action, and may be readily applied to any standard gas engine.

The above and additional objects are accomplished by such means as are illustrated in the accompanying drawings, described in the following specification, and then more particularly pointed out in the claims which are appended hereto and form a part of this application.

With reference to the drawings, wherein I have illustrated the preferred embodiment of my invention, as it is reduced to practice, and throughout the several views of which, similar reference numerals designate corresponding parts: Figure 1 is a section view, taken through an engine cylinder equipped with the valve of this invention, and illustrating the gearing connecting the drive shaft to the engine in assembled operative position. Fig. 2 is a top plan view. Fig. 3 is a section on the line 3—3 of Fig. 1.
Proceeding now to the description of the drawings, the numeral 1 designates the wall of the engine cylinder, the upper edge of which is secured to the cylinder head 2. The spark plug 3 and priming cup 4 are arranged in the cylinder head in the usual manner, while the lubricant core or passage 5, having an oil cup 6 at its outer end is formed in the cylinder in the usual manner.

The valve of this invention includes a hub 7 fixed on a valve stem 8, and a pair of substantially semicircular valve plates 9 and 10 which are connected to the hub 7 by the arcuate webs 11 and 12. The vertical edges of the plates are spaced from each other to provide inlet and outlet ports, respectively designated in Fig. 3 by the letters A and B. The valve is arranged centrally and interiorly of the cylinder and is disposed to rotate within a bushing 13, mounted in the upper end of the cylinder.

By reference to Fig. 1 it will be observed that the upper and outer edges of the valve plates 9 and 10 are chamfered to facilitate the distribution of the lubricant in the cylinder during the rotation of the valve.

In this connection it is to be observed that this valve is particularly designed for long stroke engines, and it has been found in practice that it is desirable to extend the cylinder head to provide a space for the reception of this valve. It will be noted that the hub, web and plates of this valve are comparatively thick, the obvious purpose of this construction being to prevent an undue increase in the clearance volume and to provide only the required area for the admission and exhaust of the gases.

It will be observed by reference to Fig. 3, that the ports A and B are diametrically opposed, while the inlet and outlet ports formed in the engine cylinder wall are circumferentially spaced from each other a distance less than 180°, for a purpose to be hereinafter disclosed. The inlet and outlet ports formed in the cylinder wall are respectively designated by the letters A' and B' and are formed in the nature of elongated slots, extending transversely of the cylinder.

The valve stem 8 extends upwardly above the cylinder head and is journaled adjacent its upper terminal in the bearing bracket 14, which is fixed on the cylinder in any desired manner. The extreme terminal of the member 8 carries a gear wheel 15, arranged to mesh with a worm gear 16, which is fixed on a stub shaft 17, journaled in a bearing box 18 formed integrally with the bracket 14. A sprocket wheel 19 is carried terminally on the shaft 17, and is operatively connected to the engine shaft by the chain 20 in the customary manner.

The gears are of such ratio that the valve hub 7 rotates a quarter turn during every stroke of the piston.

The actual construction of the valve being thus disclosed, it now remains to describe the operation of the device when the engine is running. Briefly the operation is as follows: Presuming that the piston has just completed the exhaust stroke, it will be observed that the exhaust port A is in registration with the cylinder exhaust port A', and that the inlet B is sealed by the bushing 13. As the piston starts downwardly on the intake stroke, the port B is brought into registration with the port B' and at the same time the port A is sealed. It will thus be observed that the gas is admitted to the cylinder and on the start of the compression stroke, the port B passes out of registration with the port B' and is again sealed by the bushing 13. The piston then completes the compression stroke and the gas explodes. In this connection it is to be observed that the spark points are arranged in a recess 3' formed in the cylinder head to prevent the valve in its rotation from striking the points.

In reduction to practice, I have found that the form of my invention, illustrated in the drawings and referred to in the above description, as the preferred embodiment, is the most efficient and practical; yet, realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

What is claimed is:

A rotary valve consisting of relatively large semi-cylindrical plates, a hub member, a valve stem fixed to said hub member, said plates being disposed in spaced relation at their straight and opposed edges and forming diametrically opposed longitudinally extending openings, arcuate webs formed integral with the plates and the hub holding said plates in spaced relation to the hub, said webs being relatively thin.

In testimony whereof I affix my signature in presence of two witnesses.

ERNEST L. FABER.

Witnesses:
E. CREWS FABER,
CARLTON E. DUNFORD.